United States Patent [19]

Saeger et al.

[11] Patent Number: 5,430,494
[45] Date of Patent: Jul. 4, 1995

[54] INDEPENDENT HORIZONTAL PANNING FOR SIDE-BY-SIDE PICTURES

[75] Inventors: Timothy W. Saeger, Indianapolis; Nathaniel H. Ersoz, Brownsburg; Donald H. Willis, Indianapolis, all of Ind.

[73] Assignee: Thomson Consumer Electronics, Inc., Indianapolis, Ind.

[21] Appl. No.: 171,141

[22] Filed: Dec. 21, 1993

Related U.S. Application Data

[63] Continuation-in-part of Ser. No. 817,685, Jan. 7, 1992, Pat. No. 5,287,188, and a continuation-in-part of Ser. No. 985,683, Dec. 3, 1992 said Ser. No. 817,685, is a continuation-in-part of PCT/US91/03817, May 30, 1991.

[51] Int. Cl.$^6$ ......................... H04N 5/45; H04N 5/262
[52] U.S. Cl. .................................. 348/565; 348/568; 348/567; 348/588
[58] Field of Search ............... 348/565, 568, 561, 567, 348/705, 469, 588, 578; H04N 5/45, 5/445, 9/74, 5/262; 358/183, 22, 22 PIP

[56] References Cited

U.S. PATENT DOCUMENTS

| | | | |
|---|---|---|---|
| 4,134,128 | 1/1979 | Hurst | 358/160 |
| 4,163,249 | 7/1979 | Michael | 358/180 |
| 4,302,776 | 11/1981 | Taylor | 358/180 |
| 4,623,922 | 11/1986 | Wischermann | 358/160 |
| 4,743,970 | 5/1988 | Barnett et al. | 358/183 |
| 4,768,093 | 8/1988 | Prodan | 358/160 |
| 4,831,447 | 5/1989 | Lake, Jr. | 358/183 |
| 4,839,728 | 6/1989 | Casey | 358/183 |
| 4,853,779 | 8/1989 | Hammer et al. | 358/133 |
| 4,891,702 | 1/1990 | Nakayama | 358/180 |
| 4,893,123 | 1/1990 | Boisson | 341/143 |
| 4,985,766 | 1/1991 | Morrison et al. | 358/133 |
| 4,992,874 | 2/1991 | Willis et al. | 358/183 |
| 4,998,171 | 3/1991 | Kim et al. | 358/183 |
| 5,016,106 | 5/1991 | Yong-Je et al. | 358/183 |
| 5,045,994 | 9/1991 | Kim | 358/160 X |
| 5,047,857 | 9/1991 | Duffield | 358/183 |
| 5,065,346 | 11/1991 | kawai et al. | 358/183 X |
| 5,084,765 | 1/1992 | Morita | 358/180 |
| 5,091,785 | 2/1992 | Canfield et al. | 358/183 |
| 5,138,455 | 8/1992 | Okumura et al. | 358/183 |
| 5,142,368 | 8/1992 | Pohl | 358/183 |
| 5,153,728 | 10/1992 | Nakayama | 358/180 |
| 5,287,188 | 2/1994 | Saeger et al. | 348/565 |
| 5,311,309 | 5/1994 | Ersoz et al. | 348/409 |
| 5,313,303 | 5/1994 | Ersoz et al. | 348/439 |
| 5,329,369 | 7/1994 | Willis et al. | 348/556 |

FOREIGN PATENT DOCUMENTS

| | | |
|---|---|---|
| 0514819 | 11/1992 | European Pat. Off. |
| 4300043 | 7/1993 | Germany |
| 61-194981 | 8/1986 | Japan |
| 63-48977 | 3/1988 | Japan |
| 2217549 | 10/1989 | United Kingdom |
| 91/19378 | 12/1991 | WIPO |
| 91/19384 | 12/1991 | WIPO |
| 91/19386 | 12/1991 | WIPO |
| 91/19387 | 12/1991 | WIPO |
| 91/19394 | 12/1991 | WIPO |
| 91/19395 | 12/1991 | WIPO |
| 91/19397 | 12/1991 | WIPO |

OTHER PUBLICATIONS

U.S. Ser. No. 7,985,683, filed Dec. 3, 1992.
IEEE 1990 International Conference on Consumer Electronics, 6 Jun. 1990, pp. 82–83, article entitled "Multi-Feature Pix-in-Pix IC (CPIP) With Full Screen Pan and Zoom", Canfield, et al.

Primary Examiner—James J. Groody
Assistant Examiner—Sherrie Hsia
Attorney, Agent, or Firm—Joseph S. Tripoli; Joseph J. Laks; Harvey D. Fried

[57] ABSTRACT

A video display system comprises: a video display; first and second signal processors for cropping first and second video signals representative of first and second pictures; a circuit for generating a side-by-side display format of the pictures on the video display; and, a panning control circuit, responsive to panning command signals, for positioning said pictures in the side-by-side display format and for independently panning the pictures, as positioned. The panning control circuit generates independent fixed and variable delays for controlling line memories in the signal processors. Fixed delays control picture positions and variable delays control panning.

20 Claims, 5 Drawing Sheets

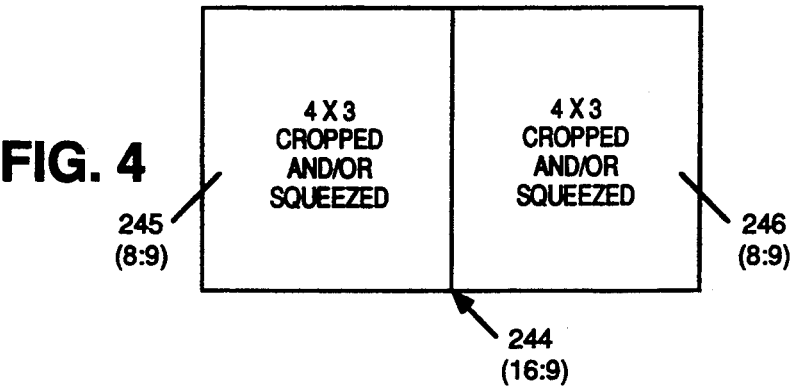
FIG. 4
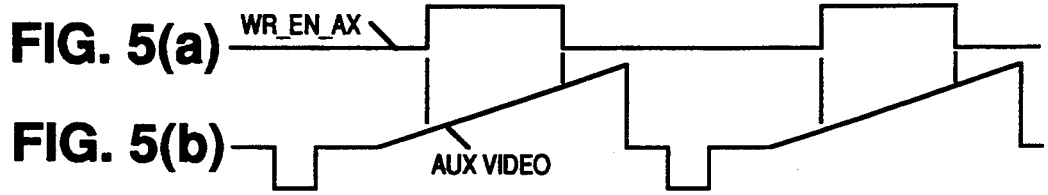
FIG. 5(a)
FIG. 5(b)
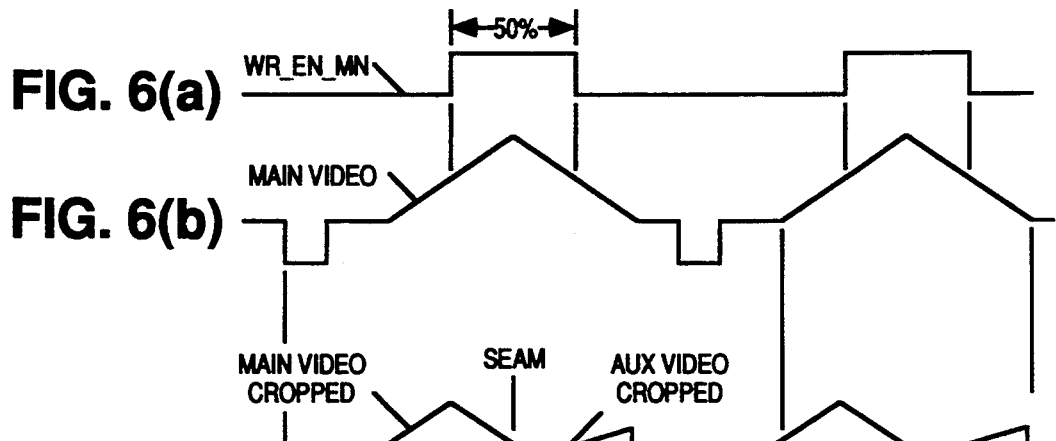
FIG. 6(a)
FIG. 6(b)
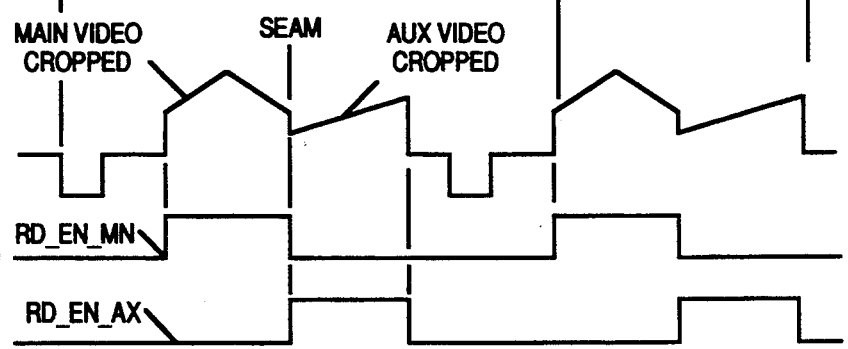
FIG. 7(a)
FIG. 7(b)
FIG. 7(c)

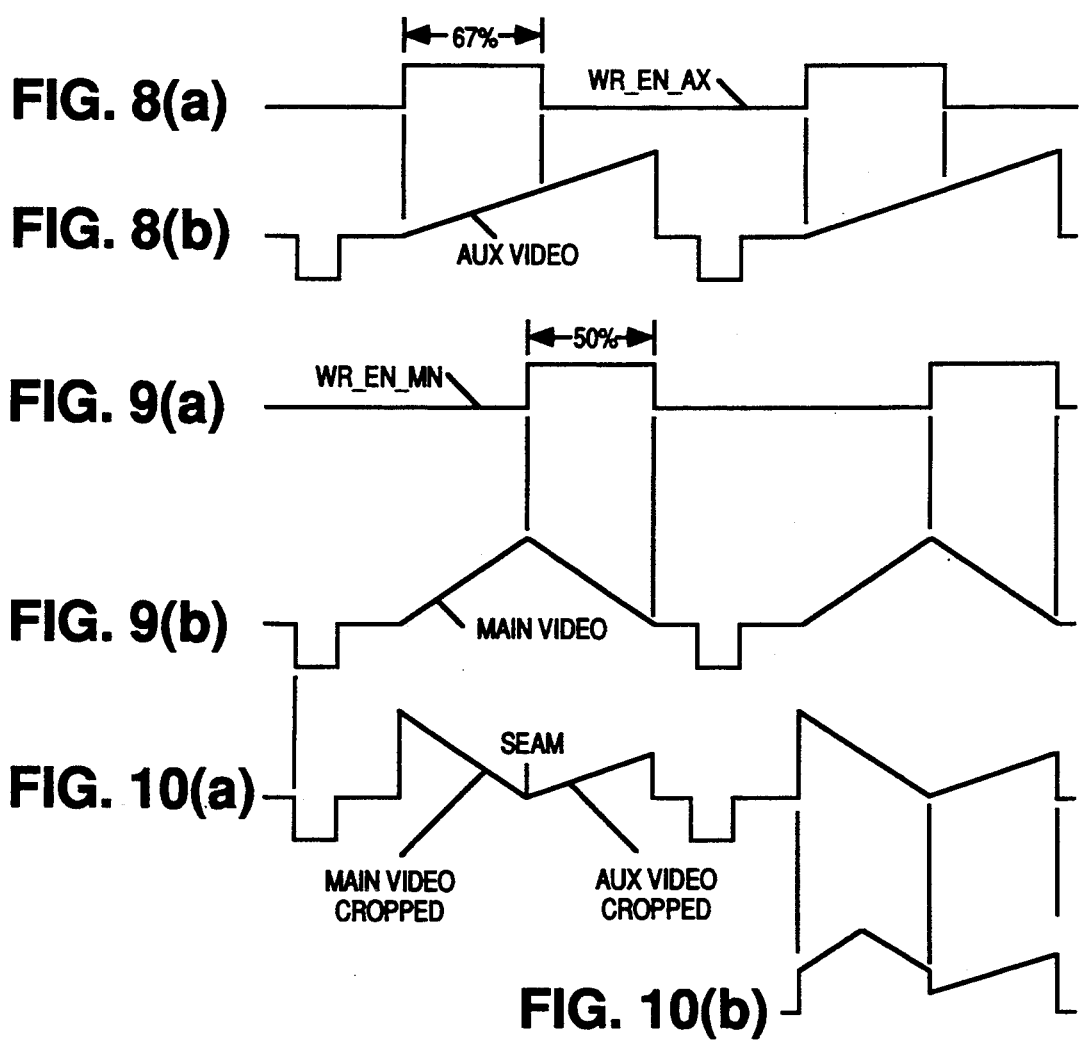

INDEPENDENT HORIZONTAL PANNING FOR SIDE-BY-SIDE PICTURES

CROSS REFERENCES TO RELATED APPLICATIONS

This application is a continuation-in-part of U.S. application Ser. No. 07/817,685, filed Jan. 7, 1992, now U.S. Pat. No. 5,287,188, application Ser. No. 07/817,685 is itself a continuation-in-part of international application Ser. No. PCT/US91/03817, filed May 30, 1991 and designating the U.S.A. This application is also a continuation-in-part of U.S. application Ser. No. 07/985,683, filed Dec. 3, 1992.

BACKGROUND OF THE INVENTION

The invention relates to the field of televisions capable of displaying side-by-side pictures of substantially equal size from different sources, and in particular, to such televisions having a wide display format ratio screen. Most televisions today have a is format display ratio, horizontal width to vertical height, of 4:3. A wide format display ratio corresponds more closely to the display format ratio of movies, for example 16:9. The invention is applicable to both direct view televisions and projection televisions.

Televisions with a wide display format ratio are suited to a wide variety of displays for both conventional and wide display format signals, as well as combinations thereof in multiple picture displays. However, the use of a wide display ratio screen entails numerous problems. Changing the display format ratios of multiple signal sources, developing consistent timing signals from asynchronous but simultaneously displayed sources, switching between multiple sources to generate multiple picture displays, and providing high resolution pictures from compressed data signals are general categories of such problems. A wide screen television capable of providing high resolution, single and multiple picture displays, from single and multiple sources having similar or different format ratios, and with selectable display format ratios is disclosed, for example, in each of: WO 91/19397, published Dec. 12, 1991 and corresponding to PCT/US91/03746; and, WO 91/19395, published Dec. 12, 1991 and corresponding to PCT/US91/03742.

Such television apparatus as disclosed in WO 91/19397 and WO 91/19395 can display multiple pictures simultaneously, for example from two video sources. The video sources may be multiple tuners in the television, a tuner in a video cassette recorder, a video camera, and others. A display mode particularly suited for a wide screen television is side-by-side pictures of substantially the same size, from different video sources, for example two different channels. In a wide screen television having a display format ratio (width to height) of 16:9, each of two side-by-side pictures of comparable size in a full screen display would have a format display ratio of 8:9. In order to fit a 4:3 picture into an 8:9 space, the 4:3 picture must be horizontally cropped or horizontally compressed, or some combination of both.

The center of each side-by-side picture may be chosen for display as a default display mode for this feature. However, the relatively large amount of picture cropping may be responsible for cutting off an important part of either or both of the side-by-side pictures. This will depend upon the specific subject matter and content of each picture and will likely change over the course of the picture. In the event that either of the pictures is a sports event, for example, a viewer might find that only the center of a playing field or court is displayed and that all goals are cropped.

Panning of a main picture in a wide screen television is described in parent U.S. Pat. No. 5,287,188. Panning of a picture-in-picture (PIP) insert in a wide screen television is described in parent application Ser. No. 07/985,683. When panning a PIP, the auxiliary video which is displayed remains constant, but the location where the video is displayed is varied. The horizontal position of the PIP on the display is a function of the delay period between the start of a horizontal line being displayed and the start of reading from a first-in first-out line memory (FIFO) in the auxiliary signal path. In order to manipulate the horizontal position of the PIP, the delay between the start of each line (SOL) and the start of reading the auxiliary FIFO is varied, for example by means of a microprocessor. In the side-by-side mode, by way of contrast, the location of the auxiliary video must remain unchanged but the portion of the video signal which is displayed in that location must be varied.

SUMMARY OF THE INVENTION

Since the location on the display allocated for the auxiliary video does not change in the side-by-side mode, the delay between the start of line and the start of reading the auxiliary FIFO must remain constant. In order to change the portion of the auxiliary video which is displayed, the delay between the start of line and the start of writing into the auxiliary FIFO is varied to change the portion of the auxiliary video which is stored in the auxiliary FIFO.

A video display system which provides independent horizontal panning of side-by-side pictures, comprises a video display means, for example a wide screen television apparatus; first signal processing means for cropping a first video signal representative of a first picture; second signal processing means for cropping a second video signal representative of a second picture; means coupled to the first and second signal processing means for generating a side-by-side display of respective uncropped portions of the first and second pictures on the video display means; and, panning control means, responsive to panning command signals, for independently controlling the first and second signal processing means to select which portions of the first and second pictures form the side-by-side display. The panning command signals may be initiated, for example, by activation of buttons on a remote control unit.

A first memory in the first signal processing path has write and read ports and is responsive to the panning control means. The first video signal is written into the first memory in accordance with a first variable panning delay from onset of each horizontal line period of the first video signal, and read from the first memory with a first fixed delay from the onset of each horizontal line period of the first video signal. The first fixed delay locates the first picture on a first lateral side of the side-by-side display independently of the first variable panning delay.

A second memory in the second signal processing path has write and read ports and is responsive to the panning control means. The second video signal is written into the second memory in accordance with a second variable panning delay from onset of each horizontal line period of the second video signal, independently of the first variable panning delay, and read from the second memory with a second fixed delay from the onset of each horizontal line period of the first video signal, different from the first fixed delay. The second fixed delay locates the second picture on a second side of the side-by-display independently of the second variable panning delay.

The memories may be first-in-first-out (FIFO) line memories having asynchronous write and read ports. Means for generating the panning command signals responsive to user input may comprise a remote control unit.

BRIEF DESCRIPTION OF THE DRAWINGS

FIG. 4 is a diagram of a side-by-side display on a wide screen television.

FIGS. 5(a)-5(b), 6(a)-6(b) and 7(a)-7(c) are timing diagrams useful for explaining the generation of the display format shown in FIG. 4, using fully cropped signals.

FIGS. 8(a)-8(b), 9(a)-9(b) and 10(a)-10(b) are timing diagrams useful for explaining independent horizontal panning with respect to the timing diagrams of FIGS. 5(a)-5(b), 6(a)-6(b) and 7(a)-7(c).

DETAILED DESCRIPTION OF THE PREFERRED EMBODIMENTS

Figure 1:
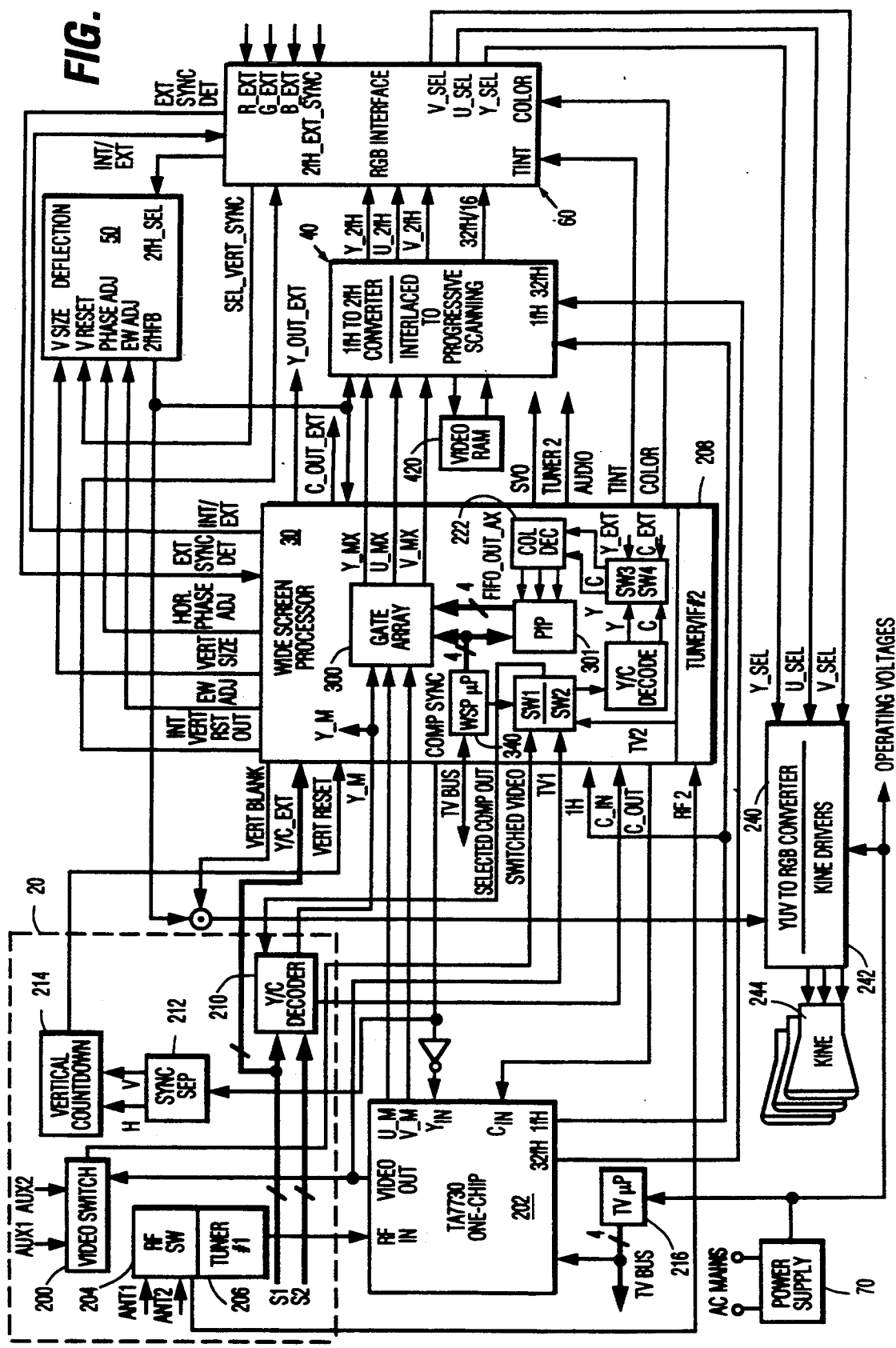
FIG. 1 is a block diagram of a wide screen television adapted for operation at $2f_H$ horizontal scanning.

An overall block diagram for a wide screen television apparatus in accordance with WO 91/19397 and WO 91/19395, and adapted to operate with $2f_H$ horizontal scanning, is shown in FIG. 1 and generally designated 10. The television 10 generally comprises a video signals input section 20, a chassis or TV microprocessor (TV μP) 216, a wide screen processor 30, a 1$f_H$ to 2$f_H$ converter 40, a deflection circuit 50, an RGB interface 60, a YUV to RGB converter 240, kine drivers 242, direct view or projection tubes 244 and a power supply 70. The YUV to RGB converter 240 may be an industry type TA7777. The grouping of various circuits into different functional blocks is made for purposes of convenience in description, and is not intended as limiting the physical position of such circuits relative to one another.

The video signals input section 20 is adapted for receiving a plurality of composite video signals from different video sources. The video signals may be selectively switched for display as main and auxiliary video signals. An RF switch 204 has two antenna inputs ANT1 and ANT 2. These represent inputs for both off-air antenna reception and cable reception. The RF switch 204 controls which antenna input is supplied to a first tuner 206 and to a second tuner 208. The output of first tuner 206 is an input to a one-chip 202, which performs a number of functions related to tuning, horizontal and vertical deflection and video controls. The particular one-chip shown is industry designated type TA7777. The baseband video signal VIDEO OUT developed in the one-chip and resulting from the signal from first tuner 206 is an input to both video switch 200 and the TV1 input of wide screen processor 30. Other baseband video inputs to video switch 200 are designated AUX1 and AUX 2. These might be used for video cameras, laser disc players, video tape players, video games and the like. The output of the video switch 200, which is controlled by the chassis or TV microprocessor 216 is designated SWITCHED VIDEO. The SWITCHED VIDEO is another input to wide screen processor 30.

A switch SW1 wide screen processor selects between the TV1 and SWITCHED VIDEO signals as a SEL COMP OUT video signal which is an input to a Y/C decoder 210. The Y/C decoder 210 may be implemented as an adaptive line comb filter. Two further video sources S1 and S2 are also inputs to the Y/C decoder 210. Each of S1 and S2 represent different S-VHS sources, and each consists of separate luminance and chrominance signals. A switch, which may be incorporated as part of the Y/C decoder, as in some adaptive line comb filters, or which may be implemented as a separate switch, is responsive to the TV microprocessor 216 for selecting one pair of luminance and chrominance signals as outputs designated $Y_{13}M$ and $C_{13}IN$ respectively. The selected pair of luminance and chrominance signals is thereafter considered the main signal and is processed along a main signal path. Signal designations including $_{13}M$ or $_{13}MN$ refer to the main signal path. The chrominance signal $C_{13}IN$ is redirected by the wide screen processor back to the one-chip, for developing color difference signals $U_{13}M$ and $V_{13}M$. In this regard, U is an equivalent designation for (R-Y) and V is an equivalent designation for (B-Y). The $Y_{13}M$, $U_{13}M$, and $V_{13}M$ signals are converted to digital form in the wide screen processor for further signal processing.

A second tuner 208, functionally defined as part of the wide screen processor 30, develops a baseband video signal TV2. A switch SW2 selects between the TV2 and SWITCHED VIDEO signals as an input to a Y/C decoder 210. The Y/C decoder 210 may be implemented as an adaptive line comb filter. Switches SW3 and SW4 select between the luminance and chrominance outputs of Y/C decoder 220 and the luminance and chrominance signals of an external video source, designated $Y_{13}EXT$ and $C_{13}EXT$ respectively. The $Y_{13}EXT$ and $C_{13}EXT$ signals correspond to the S-VHS input S1. The Y/C decoder 220 and switches SW3 and SW4 may be combined, as in some adaptive line comb filters. The output of switches SW3 and SW4 is thereafter considered the auxiliary signal and is processed along an auxiliary signal path. The selected luminance output is designated $Y_{13}A$. Signal designations including $_{13}A$, $_{13}AX$ and $_{13}AUX$ refer to the auxiliary signal path. The selected chrominance is converted to color difference signals $U_{13}A$ and $V_{13}A$. The $Y_{13}A$, $U_{13}A$ and $V_{13}A$ signals are converted to digital form for further signal processing. The arrangement of video signal source switching in the main and auxiliary signal paths maximizes flexibility in managing the source selection for the different parts of the different picture display formats.

A composite synchronizing signal COMP SYNC, corresponding to $Y_{13}M$ is provided by the wide screen processor to a sync separator 212. The horizontal and vertical synchronizing components H and V respectively are inputs to a vertical countdown circuit 214. The vertical countdown circuit develops a VERTICAL RESET signal which is directed into the wide screen processor 30. The wide screen processor generates an internal vertical reset output signal INT VERT RST OUT directed to the RGB interface 60. A switch in the RGB interface 60 selects between the internal vertical reset output signal and the vertical synchronizing component of the external RGB source. The output of this switch is a selected vertical synchronizing component SEL$_{13}$VERT$_{13}$SYNC directed to the deflection circuit 50. Horizontal and vertical synchronizing signals of the auxiliary video signal are developed by sync separator 212 in the wide screen processor.

The 1$f_H$ to 2$f_H$ converter 40 is responsible for converting interlaced video signals to progressively scanned noninterlaced signals, for example one wherein each horizontal line is displayed twice, or an additional set of horizontal lines is generated by interpolating adjacent horizontal lines of the same field. In some instances, the use of a previous line or the use of an interpolated line will depend upon the level of movement which is detected between adjacent fields or frames. The converter circuit 40 operates in conjunction with a video RAM 420. The video RAM may be used to store one or more fields of a frame, to enable the progressive display. The converted video data as Y$_{13}$2$f_H$, U$_{13}$2$f_H$ and V$_{13}$2$f_H$ signals is supplied to the RGB interface 60.

The RGB interface 60 enables selection of the converted video data or external RGB video data for display by the video signals input section. The external RGB signal is deemed to be a wide format display ratio signal adapted for 2$f_H$ scanning. The vertical synchronizing component of the main signal is supplied to the RGB interface by the wide screen processor as INT VERT RST OUT, enabling a selected vertical sync ($f_{Vm}$ or $f_{Vext}$) to be available to the deflection circuit 50. Operation of the wide screen television enables user selection of an external RGB signal, by generating an internal/external control signal INT/EXT. However, the selection of an external RGB signal input, in the absence of such a signal, can result in vertical collapse of the raster, and damage to the cathode ray tube or projection tubes. Accordingly, the RGB interface circuit detects an external synchronizing signal, in order to override the selection of a non-existent external RGB input. The WSP microprocessor 340 also supplies color and tint controls for the external RGB signal.

The wide screen processor 30 comprises a picture in picture processor 301 for special signal processing of the auxiliary video signal. A gate array 300 combines the main and auxiliary video signal data in a wide variety of display formats. The picture-in-picture processor (PIP) 301 and gate array 300 are under the control of a wide screen microprocessor (WSP μP) 340. Microprocessor 340 is responsive to the TV microprocessor 216 over a serial bus. The serial bus includes four signal lines, for data, clock signals, enable signals and reset signals. The wide screen processor 30 also generates a composite vertical blanking/reset signal, as a three level sand castle signal. Alternatively, the vertical blanking and reset signals can be generated as separate signals.

The deflection circuit 50 receives a vertical reset signal from the wide screen processor, a selected 2$f_H$ horizontal synchronizing signal from the RGB interface 60 and additional control signals from the wide screen processor. These additional control signals relate to horizontal phasing, vertical size adjustment and east-west pin adjustment. The deflection circuit 50 supplies 2$f_H$ flyback pulses to is the wide screen processor 30, the 1$f_H$ to 2$f_H$ converter 40 and the YUV to RGB converter 240.

Operating voltages for the entire wide screen television are generated by a power supply 70 which can be energized by an AC mains supply.

Figure 2:
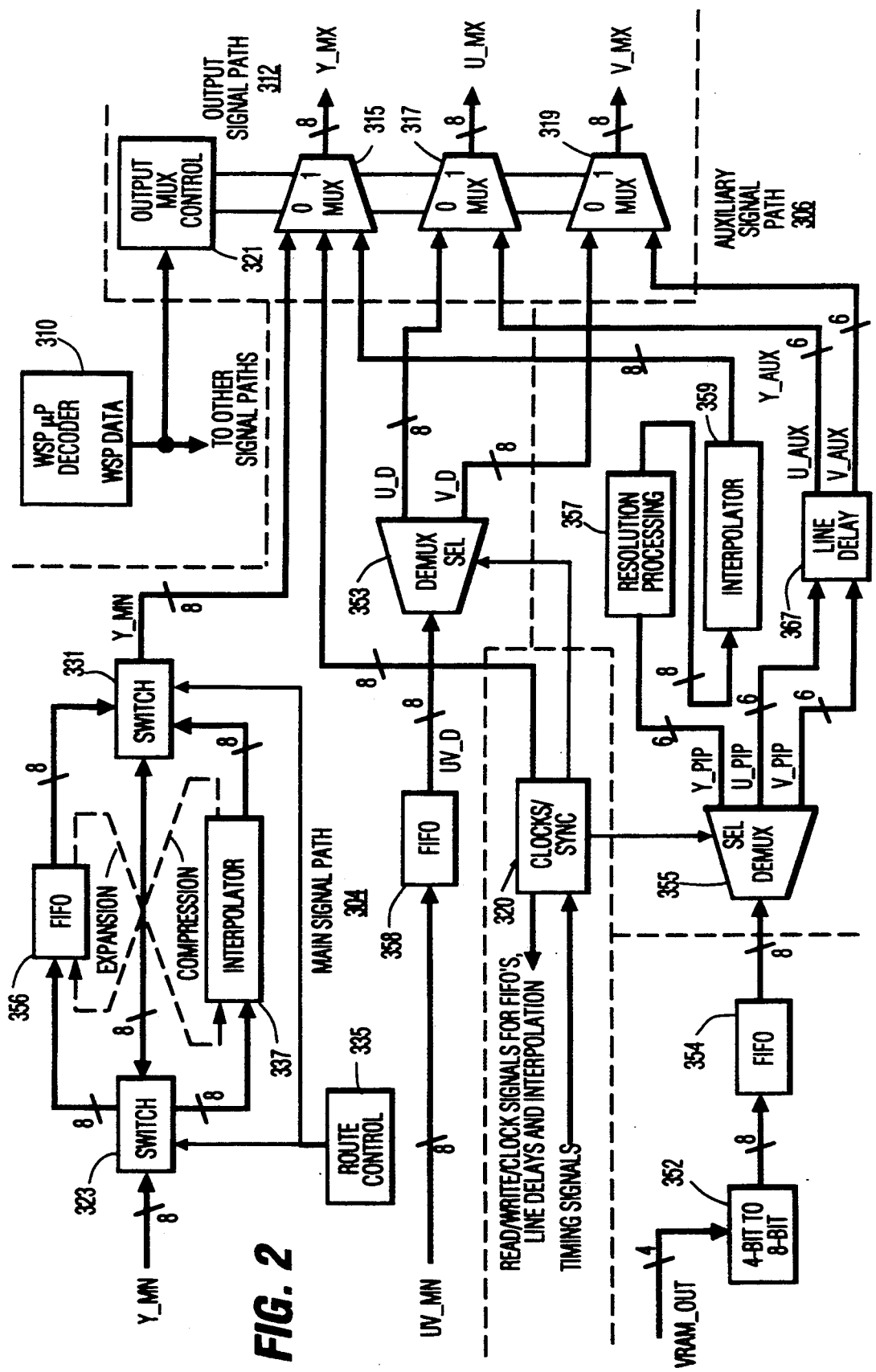
FIG. 2 is a block diagram of the gate array of FIG. 1, illustrating the main, auxiliary and output signal paths.

The gate array is shown in FIG. 2. Gate array 300 is responsible for combining video information from the main and auxiliary signal paths to implement a composite wide screen display. The main video signal is supplied to the wide screen processor in analog form, and Y U V format, as signals designated Y$_{13}$M, U$_{13}$M and V$_{13}$M. These main signals are converted from analog to digital form by analog to digital converters. The main signal path 304, auxiliary signal path 306 and output signal path 312 of the gate array 300 are shown in block diagram form. The gate array also comprises a clocks/sync circuit 320 and a WSP μP decoder 310. Data and address output lines of the WSP μP decoder 310, identified as WSP DATA, are supplied to each of the main circuits and paths identified above, as well as to the picture-in-picture processor 301 and resolution processing circuit 357.

The gate array is responsible for expanding, compressing and cropping video data of the main video channel, as and if necessary, to implement different picture display formats. The luminance component Y$_{13}$MN is stored in a first in first out (FIFO) line memory 356 for a length of time depending on the nature of the interpolation of the luminance component. The combined chrominance components U/V$_{13}$MN are stored in FIFO 358. Auxiliary signal luminance and chrominance components Y$_{13}$PIP, U$_{13}$PIP and V$_{13}$PIP are developed by demultiplexer 355. The luminance component undergoes resolution processing, as desired, in circuit 357, and is expanded as necessary by interpolator 359, generating signal Y$_{13}$AUX as an output.

In some instances, the auxiliary display will be as large as the main signal display. Due to memory limitations associated with the picture-in-picture processor and associated video RAM, not shown, a resolution processing circuit 357 can be used to restore apparent resolution to the auxiliary video signal which was lost during data compression, or reduction. As an example, circuit 357 may be a dedithering circuit if the video signal has previously been dithered.

The auxiliary video input data is sampled at a 640$f_H$ rate and is stored in PIP video RAM. The auxiliary data is read out of PIP video RAM is designated VRAM$_{13}$_OUT. The PIP circuit 301 also has the capability of reducing the auxiliary picture by equal integer factors horizontally and vertically, as well as asymmetrically. The auxiliary channel data is buffered and synchronized to the main channel digital video by the 4-bit latches 352, the auxiliary FIFO 354 and clocks/sync circuit 320. The VRAM$_{13}$OUT data is sorted into Y (luminance), U, V (color components), and (fast switch data), not shown, by demultiplexer 355. The fast switch data indicates which field type was written into the video RAM. A PIP fast switch signal, not shown, is received directly from the PIP circuit and applied to the output MUX control circuit 321 to determine which field read out of the PIP video RAM is to be displayed during the small picture modes.

The auxiliary channel is sampled at 640$f_H$ rate while the main channel is sampled at a 1024$f_H$ rate. The auxiliary channel FIFO 354 converts the data from the auxiliary channel sample rate to the main channel clock rate in this process, the video signal undergoes an 8/5 (1024/640) compression. This is more than the 4/3 compression necessary to correctly display the auxiliary channel signal. Therefore, the auxiliary channel must be expanded by the interpolator 359 to correctly display a 4×3 small picture. The interpolator 359 is controlled indirectly by the WSP μP 340, through an interpolator control circuit, not shown. The amount of interpolator expansion required is 5/6. The expansion factor X is determined as follows:

$$X = (640/1024)^*(4/3) = 5/6$$

The chrominance components $U_{13}PIP$ and $V_{13}PIP$ are delayed by circuit 367 for a length of time depending on the nature of the interpolation of the luminance component, generating signals $U_{13}AUX$ and $V_{13}AUX$ as outputs. The respective Y, U and V components of the main and auxiliary signals are combined in respective multiplexers 315, 317 and 319 in the output signal path 312, by controlling the read enable signals of the FIFO's 354, 356 and 358. The multiplexers 315, 317 and 319 are responsive to output multiplexer control circuit 321. Output multiplexer control circuit 321 is responsive to a clock signal, a start of line signal, a horizontal line count signal, a vertical blanking reset signal and the fast switch data signal. The multiplexed luminance and chrominance components $Y_{13}MX$, $U_{13}MX$ and $V_{13}MX$ are supplied to respective digital/analog converters. The digital to analog converters are followed by low pass filters. The various functions of the picture-in-picture processor, the gate array and the data reduction circuit are controlled by WSP μP 340. The WSP μP 340 is responsive to the TV μP 216, being connected thereto by a serial bus. The serial bus may be a four wire bus as shown, having lines for data, clock signals, enable signals and reset signals. The WSP μP 340 communicates with the different circuits of the gate array through a WSP μP decoder 310.

In one case, it is necessary to compress the 4×3 NTSC video by a factor of 4/3 to avoid aspect ratio distortion of the displayed picture. In the other case, the video can be expanded to perform horizontal zooming operations usually accompanied by vertical zooming. Horizontal zoom operations up to 33% can be accomplished by reducing compressions to less than 4/3. A sample interpolator is used to recalculate the incoming video to a new pixel positions because the luminance video bandwidth, up to 5.5 MHz for S-VHS format, occupies a large percentage of the Nyquist fold over frequency, which is 8 MHz for a $1024f_H$ clock.

The luminance data $Y_{13}MN$ is routed through an interpolator 337 in the main signal path 304 which recalculates sample values based on the compression or the expansion of the video. The function of the switches or route selectors 323 and 331 is to reverse the topology of the main signal path 304 with respect to the relative positions of the FIFO 356 and the interpolator 337. In particular, these switches select whether the interpolator 337 precedes the FIFO 356, as required for compression, or whether the FIFO 356 precedes the interpolator 337, as required for expansion. The switches 323 and 331 are responsive to a route control circuit 335, which is itself responsive to the WSP μP 340. During small picture modes the auxiliary video signal is compressed for storage in the PIP video RAM, and only expansion is necessary for practical purposes. Accordingly, no comparable switching is required in the auxiliary signal path.

The clocks/sync circuit 320 generates read, write and enable signals needed for operating FIFOs 354, 356 and 358. The FIFOs for the main and auxiliary channels are enabled for writing data into storage for those portions of each video line which is required for subsequent display. Data is read from one of the main or auxiliary channels as necessary to combine data from each source on the same video line or lines of the display. The FIFO 354 of the auxiliary channel is written synchronously with the auxiliary video signal, but is read out of memory synchronously with the main video signal. The main video signal components are written into the FIFOs 356 and 358 synchronously with the main video signal, and are read out of memory synchronously with the main video. Switching the read function back and forth between the main and auxiliary channels is a function of the particular special effect chosen.

Generation of different special effects such as cropped side-by-side pictures as shown in FIG. 4 are accomplished through manipulating the read and write enable control signals for the line memory FIFOs. The process for this display format is illustrated in FIGS. 5(a)–5(b), 6(a)–6(b) and 7(a)–7(c). The auxiliary video signal is shown in FIG. 5(b). The active video of the auxiliary video signal is illustrated as a simple ramp. In the case of cropped side-by-side displayed pictures, the write enable control signal ($WR_{13}EN_{13}AX$) for 2048×8 FIFO 354 of the auxiliary channel is active for $(\frac{1}{2})^*(4/3) = 0.67$ or approximately 67% of the auxiliary channel active line period (pre speed up), as shown in FIG. 5(a). This corresponds to approximately 33% cropping (approximately 67% active picture) and a compression ratio of 4/3 being performed on the auxiliary channel video. In the main video channel, shown in FIG. 6(b), the main video signal is illustrated as a simple triangle. The write enable control signal ($WR_{13}EN_{13}MN_{13}Y$) for the 910×8 FIFOs 356 and 358 is active for $(\frac{1}{2})^*(4/3) = 0.67$ or 67% of the main channel active line period, as shown in FIG. 6(a). This corresponds to approximately 33% cropping and a compression ratio of 4/3 being performed on the main channel video by the 910×8 FIFOs.

In each of the FIFOs, the video data is buffered to be read out at a particular point in time. The active region of time where the data may be read out from each FIFO is determined by the display format chosen. In the example of the side-by-side cropped mode is shown, the main channel video is being displayed on the left hand half of the display and the auxiliary channel video is displayed on the right hand half of the display. The arbitrary video portions of the waveforms are different for the main and auxiliary channels as illustrated. The read enable control signal ($RD_{13}EN_{13}MN$) of the main channel 910×8 FIFOs is active for 50% of the display active line period of the display beginning with the start of active video, immediately following the video back porch, as shown in FIG. 7(b). The auxiliary channel read enable control signal ($RD_{13}EN_{13}AX$) is active for the other 50% of the display active line period beginning with the falling edge of the $RD_{13}EN_{13}MN$ signal and ending with the beginning of the main channel video front porch, as shown in FIG. 7(c). The resulting side-by-side picture in shown in FIG. 7(a). The left half of the side-by-side picture is the center portion of the main picture. The right half of the side-by-side picture is the center portion of the auxiliary picture. The border between the left and right halves is denoted by a seam. It may be noted that write enable control signals are synchronous with their respective FIFO input data (main or auxiliary) while the read enable control signals are synchronous with the main channel video.

A side-by-side display is particularly effective and appropriate for a wide format display ratio display, for example 16×9. Most NTSC signals are represented in a 4×3 format, which of course corresponds to 12×9. Two 4×3 format display ratio NTSC pictures may be presented on the same 16×9 format display ratio display, either by cropping the pictures by 33% or squeezing the pictures by 33%, and introducing aspect ratio distortion. Depending on user preference, the ratio of picture cropping to aspect ratio distortion may be set any where in between the limits of 0% and 33%. As an example, two side by side pictures may be presented as 16.7% squeezed and 16.7% cropped.

Figure 3:
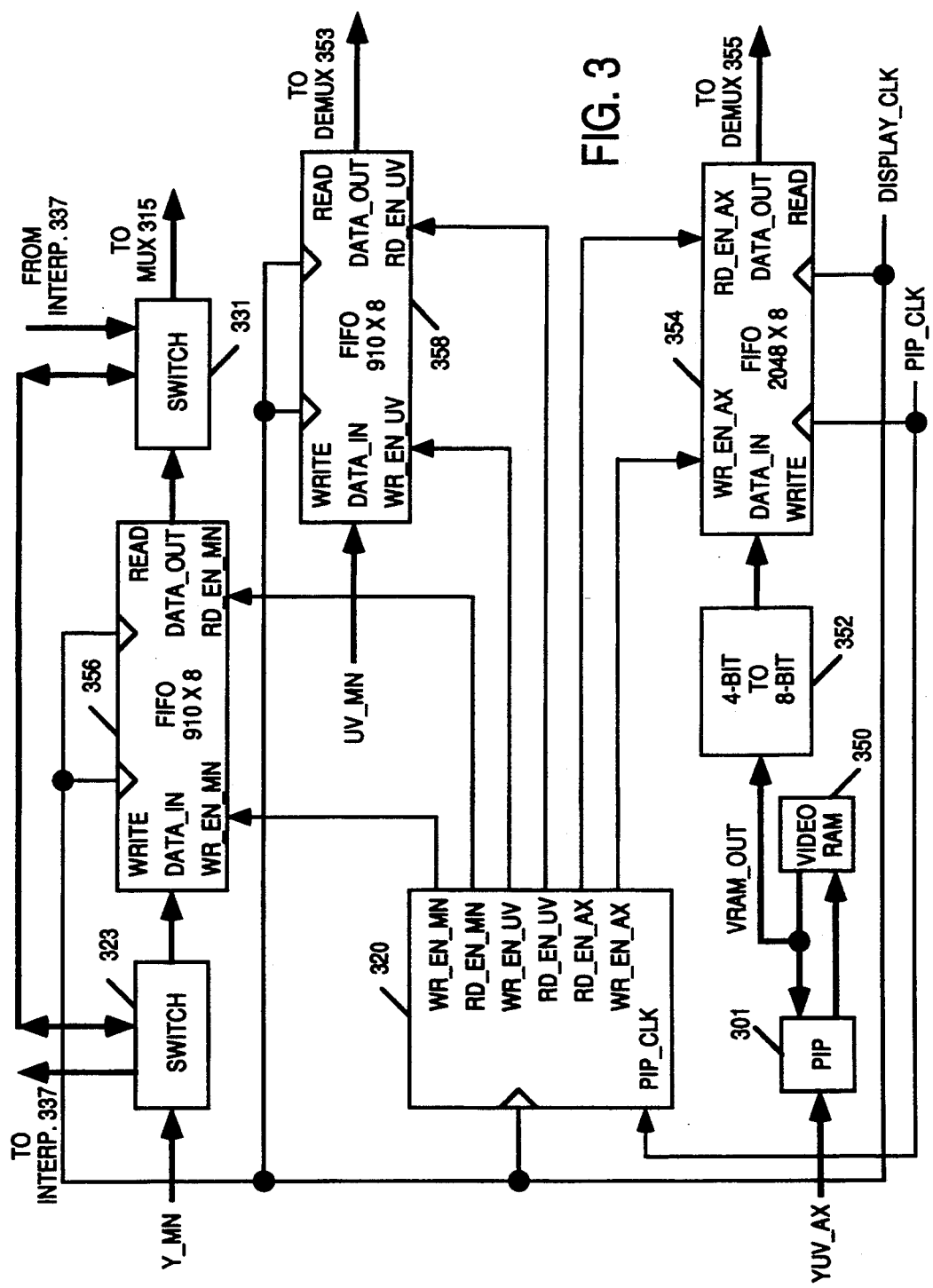
FIG. 3 is a block diagram showing portions of FIG. 2 in greater detail.

Portions of FIG. 2 are shown in greater detail in FIG. 3. The Clocks/Sync circuit 320 generates the write and read enable to signals for the main luminance ($Y_{13}MN$) FIFO 356, the main chrominance ($UV_{13}MN$) FIFO 358 and the auxiliary luminance and chrominance ($VRAM_{13}OUT$) FIFO 354. The write and read functions of the main signal path FIFO's 356 and 358 are synchronous with the display, which is synchronized with the main video signal. This is signal is denoted in FIG. 3 as $DISPLAY_{13}CLK$. The auxiliary video signal is most likely asynchronous with the main video signal. Accordingly, the write and read functions of the auxiliary signal path FIFO 354 are asynchronous with one another. The write function is synchronous with the clock signal of the picture-in-picture (PIP) processor 301, denoted as $PIP_{13}CLK$. This is the same clock signal which read data from a video RAM associated with the PIP processor as $VRAM_{13}OUT$. The read function is synchronous with the display, as shown. Some FIFO's are not provided with separate clock inputs, as are those shown in FIG. 3. The use of such other kind of FIFO, for example as the auxiliary signal path FIFO 354, might result in the need for the read function to have a different frequency than the $DISPLAY_{13}CLK$ signal, as well as different from the $PIP_{13}CLK$ signal. Even so, one of the requirements of the auxiliary signal path processing circuitry in general is to synchronize the auxiliary video data with the video display. The interpolator 359 and line delay 367 can be utilized for this purpose.

In order to avoid image aspect ratio distortion caused by squeezing the pictures, another method must be available to show cropped portions of the picture if deemed desirable by a viewer. In accordance with inventive arrangements, each of the side-by-side pictures can be horizontally panned, to the left and to the right, independently of one another. Independent panning is possible because each of the main and auxiliary video channels includes a FIFO (main channel, 356; auxiliary channel, 354) with independent write and read pointers. Horizontal panning can be accomplished by advancing or delaying the write enable windows ($WR_{13}EN_{13}MN$, $WR_{13}EN_{13}AX$). Such manipulation of the write enable windows is illustrated in FIGS. 8(a)–8(b) and 9(a) and 9(b). The auxiliary video signal shown in FIG. 8(b) is the same as the auxiliary video signal shown in FIG. 5(b). The write enable window defined by the $WR_{13}EN_{13}AX$ signal in FIG. 8(a) has been advanced with respect to that signal in FIG. 5(a). As a result, the first half of each line of the auxiliary picture is written into FIFO 354, instead of the middle half. Similarly, the main video signal shown in FIG. 9(b) the same as the main video signal shown in FIG. 6(b). The write enable window defined by the $WR_{13}EN_{13}MN$ signal in FIG. 9(a) has been delayed with respect to that signal in FIG. 6(a). As a is result, the second half of each line of the main picture is written into FIFO 356, instead of the middle half. The resulting multiplexed picture is shown in FIG. 10(a). FIG. 10(b) repeats the multiplexed picture from FIG. 7(a), to facilitate a comparison of the effects of the independent horizontal panning.

In operation, a main signal memory in the main signal processing path has write and read ports and is responsive to the panning control means. The main video signal is written into the main memory in accordance with a first variable panning delay from onset of each horizontal line period of the main video signal, and read from the main memory with a first fixed delay from the onset of each horizontal line period of the main video signal. The first fixed delay locates the main picture on a first lateral side of the side-by-side display, for example the left side, independently of the first variable panning delay.

An auxiliary signal memory in the auxiliary signal processing path has write and read ports and is also responsive to the panning control means. The auxiliary video signal is written into the auxiliary memory in accordance with a second variable panning delay from onset of each horizontal line period of the auxiliary video signal, independently of the first variable panning delay, and read from the auxiliary memory with a second fixed delay from the onset of each horizontal line period of the main video signal, different from the first fixed delay. The second fixed delay locates the auxiliary picture on a second side of the side-by-display, for example the right side, independently of the second variable panning delay. Picture position for both pictures is relative to the display means, which is generally synchronized with the main video signal.

The panning means independently control the main and auxiliary memory means. The panning means can also be characterized by the generation of a first variable delay, a first fixed delay and a second fixed delay, all relative to horizontal synchronizing signals of said main video signal, and the generation of a second variable panning delay relative to horizontal synchronizing signals of the auxiliary video signal. The main and auxiliary pictures assume the side-by-side display format responsive to the first and second fixed delays and are independently pannable responsive to the first and second variable delays. More particularly, the main and auxiliary memory means are enabled for writing in accordance with the first and second variable panning delays respectively and are enabled for reading in accordance with the first and second fixed delays respectively.

The panning command signals may be initiated, for example, by activation of buttons on a remote control unit. Different sets of up/down or +/− pairs of buttons may be utilized for the left and right side pictures respectively. Up or + might generate a pan left signal, whereas down or − might generate a pan right signal. Alternatively, one pair of up/down or +/− buttons may be used in conjunction with either one of two other buttons, which select the left or right side picture. As a further alternative, a dedicated pair or pairs of left/right buttons might be utilized. Use of the buttons for controlling panning can be selected by a menu driven process.

What is claimed is:

1. A video display system, comprising:

video display means;

first signal processing means for cropping a first video signal representative of a first picture;

second signal processing means for cropping a second video signal representative of a second picture;

means coupled to said first and second signal processing means for generating a side-by-side display of respective uncropped portions of said first and second pictures on said video display means; and, panning control means, responsive to panning command signals, for independently controlling said first and second signal processing means to select which portions of said first and second pictures form said side-by-side display.

2. The system of claim 1, wherein said first and second signal processing means comprises first and second asynchronous line memories, respectively, for cropping said first and second video signals, respectively.

3. The system of claim 2, wherein said line memories are first-in-first-out (FIFO) devices.

4. The system of claim 1, wherein said second signal processing means comprises a memory having write and read ports, said second video signal being: written into said memory responsive to said panning control means in accordance with a variable panning delay from onset of each horizontal line period of said second video signal, said second picture being panned by controlling said variable panning delay and selecting said uncropped portion for said display; and, read from said memory with a fixed delay from onset of each horizontal line period of said first video signal, which locates said second picture on one side of said side-by-side display independently of said panning of said second picture.

5. The system of claim 4, wherein said memory is a line memory having asynchronous write and read ports.

6. The system of claim 1, comprising:

a first memory in said first signal processing means having write and read ports and responsive to said panning control means, said first video signal being: written into said first memory in accordance with a first variable panning delay from onset of each horizontal line period of said first video signal; and, read from said first memory with a first fixed delay from said onset of each horizontal line period of said first video signal, which locates said first picture on a first lateral side of said side-by-side display independently of said first variable panning delay; and, a second memory in said second signal processing means having write and read ports and responsive to said panning control means, said second video signal being: written into said second memory in accordance with a second variable panning delay from onset of each horizontal line period of said second video signal, independently of said first variable panning delay; and, read from said second memory with a second fixed delay from said onset of each horizontal line period of said first video signal, different from said first fixed delay, which locates said second picture on a second side of said side-by-side display independently of said second variable panning delay.

7. The system of claim 6, wherein said first and second memories are line memories.

8. The system of claim 6, wherein said first and second memories are first-in-first-out (FIFO) line memory devices.

9. The system of claim 1, wherein said display means has a wide format display ratio.

10. The system of claim 3, wherein said display means has a wide format display ratio.

11. The system of claim 6, wherein said display means has a wide format display ratio.

12. The system of claim 1, comprising means for generating said panning command signals responsive to user input.

13. A video display system, comprising:

video display means;

first memory means for cropping a first video signal representative of a first picture;

second memory means for cropping a second video signal representative of a second picture;

means coupled to said first and second memory means for generating a side-by-side display format of respective uncropped portions of said first and second pictures on said video display means; and, panning means for independently controlling said first and second memory means, said panning means generating a first variable delay, a first fixed variable delay and a second fixed delay, all relative to horizontal synchronizing signals of said first video signal, and generating a second variable delay relative to horizontal synchronizing signals of said second video signal, said first and second pictures being thereby positioned said side-by-side display format responsive to said first and second fixed delays and being independently pannable responsive to said first and second variable delays.

14. The system of claim 13, wherein said first and second memory means are enabled for writing in accordance with said first and second variable delays respectively and are enabled for reading in accordance with the first and second fixed delays respectively.

15. The system of claim 13, wherein each of said memory means comprises asynchronous line memory.

16. The system of claim 13, wherein each of said memory means comprises a first-in-first-out (FIFO) line memory having asynchronous write and read ports.

17. A video display system, comprising:

video display means;

first signal processing means for cropping a first video signal representative of a first picture;

second signal processing means for cropping a second video signal representative of a second picture;

means coupled to said first and second signal processing means for generating an adjacent display of respective uncropped portions of said first and second pictures on said video display means, said displayed respective portions being substantially comparable in size and shape; and, panning control means, responsive to panning command signals, for independently controlling said first and second signal processing means to select which portions of said first and second pictures form said adjacent display.

18. The system of claim 17, wherein said panning control means comprises means for generating a first variable delay, a first fixed delay and a second fixed delay, all relative to horizontal synchronizing signals of said first video signal, and generating a second variable delay relative to horizontal synchronizing signals of said second video signal, said first and second pictures being thereby positioned for said adjacent display responsive to said first and second fixed delays and being independently pannable responsive to said first and second variable delays.

19. The system of claim 18, wherein each of said first and second signal processing means comprises a memory, said first and second variable delays being utilized for writing into said memories and said first and second fixed delays being used for reading from said memories.

20. The system of claim 17, wherein said video display means has a wide format display ratio.

* * * * *